(12) United States Patent
Lee

(10) Patent No.: US 11,281,311 B2
(45) Date of Patent: Mar. 22, 2022

(54) SWITCH MODULE AND WIRELESS MOUSE INCLUDING THE SAME

(71) Applicant: Cheng Uei Precision Industry Co., Ltd., New Taipei (TW)

(72) Inventor: Tsung Shih Lee, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 77 days.

(21) Appl. No.: 16/923,170

(22) Filed: Jul. 8, 2020

(65) Prior Publication Data

US 2021/0141468 A1  May 13, 2021

(30) Foreign Application Priority Data

Nov. 8, 2019  (CN) .......................... 201921925964.1

(51) Int. Cl.
*G06F 3/0354* (2013.01)
*G06F 3/038* (2013.01)
*H04W 4/80* (2018.01)

(52) U.S. Cl.
CPC .......... *G06F 3/03543* (2013.01); *G06F 3/038* (2013.01); *H04W 4/80* (2018.02); *G06F 2203/0384* (2013.01)

(58) Field of Classification Search
CPC ................. G06F 3/03543; G06F 3/038; G06F 2203/0384; G06F 3/0383; G06F 1/263; H04W 4/80; H01H 13/14; H01H 13/02; H01H 13/04
See application file for complete search history.

(56) References Cited

U.S. PATENT DOCUMENTS

| 8,598,479 B2* | 12/2013 | Quan | H01H 13/7073 |
| | | | 200/293 |
| 11,119,588 B2* | 9/2021 | Lee | H01H 13/52 |
| 2016/0217943 A1* | 7/2016 | Kim | H01H 13/14 |
| 2020/0152401 A1* | 5/2020 | Huang | H01H 13/023 |
| 2021/0103347 A1* | 4/2021 | Lee | G06F 3/038 |

* cited by examiner

*Primary Examiner* — Bryan Earles
(74) *Attorney, Agent, or Firm* — Lin & Associates Intellectual Property, Inc.

(57) ABSTRACT

A switch module includes a pressing button, an elastic element and a circuit board. One side of the pressing button protrudes downward to form an operation rod. The operation rod is slidably exposed out of a wireless mouse. The operation rod is pushed to move from a first position to a second position. The one side of the pressing button has an extending arm. Two portions of an upper surface of the one side of the pressing button protrudes upward to form two extending feet. The elastic element is fastened on the one side of the pressing button. The elastic element is fastened to a bottom surface of the circuit board. The circuit board is disposed above the pressing button. The circuit board is equipped with a first switch and a second switch. The first switch is clamped between the two extending feet.

17 Claims, 13 Drawing Sheets

SWITCH MODULE AND WIRELESS MOUSE INCLUDING THE SAME

CROSS-REFERENCE TO RELATED APPLICATION

The present application is based on, and claims priority from, China Patent Application No. 201921925964.1, filed Nov. 8, 2019, the disclosure of which is hereby incorporated by reference herein in its entirety.

BACKGROUND OF THE INVENTION

1. Field of the Invention

The present invention generally relates to a switch and a mouse, and more particularly to a switch module of which an assembling space is smaller, and a wireless mouse including the switch module, and having a lower cost.

2. The Related Art

As is known to all, a wireless mouse has a wireless transmission capacity and is capable of being paired with a computer host to be used by a wireless technology. When a user operates the wireless mouse, the wireless mouse is used without a limitation of a cable, so the wireless mouse is used quite conveniently.

Generally, when a conventional wireless mouse is paired with the computer host, a USB (Universal Serial Bus) adapter need be inserted into an insertion hole of the computer host. The conventional wireless mouse includes a switch. When the switch is turned on, operation orders of the conventional wireless mouse are capable of being transmitted to the computer host by virtue of the USB adaptor. However, the conventional wireless mouse need provide the USB adaptor to the user, and it is inconvenient to carry the conventional wireless mouse and the USB adaptor, so when the conventional wireless mouse is used, the conventional wireless mouse will have a loss problem and have a higher cost.

Another conventional wireless mouse is a bluetooth mouse, the bluetooth mouse is capable of being paired with the computer host to be used through a bluetooth technology, and the USB adaptor is needless of being provided in addition. The bluetooth mouse includes a switch module which includes a switch and a bluetooth pairing key. However, the bluetooth mouse need provide the bluetooth pairing key additionally, when the user uses the bluetooth mouse, the switch of the bluetooth mouse must be turned on to realize a power-on function, and then the bluetooth pairing key is pressed to proceed with a bluetooth pairing. Furthermore, the switch and the bluetooth pairing key of the bluetooth mouse on the market are mostly two independent and separated structures, so an assembling space of the switch module is larger and a cost of the switch module is higher, correspondingly the bluetooth mouse has a higher cost, and a larger assembling space of the bluetooth mouse is considered to mount the switch module in the bluetooth mouse.

In view of the above-mentioned problems, it is essential to provide an innovative switch module of which an assembling space is smaller, and an innovative wireless mouse including the innovative switch module, and the innovative wireless mouse has a smaller assembling space and a lower cost.

SUMMARY OF THE INVENTION

An object of the present invention is to provide a switch module applied in a wireless mouse. The switch module includes a pressing button, an elastic element and a circuit board. A lower surface of one side of the pressing button protrudes downward to form an operation rod. The operation rod is slidably exposed out of the wireless mouse. The wireless mouse has a first position and a second position opposite to each other. The operation rod is pushed to move from the first position to the second position. The one side of the pressing button has an extending arm. At least one portion of an upper surface of the one side of the pressing button protrudes upward to form at least one extending foot. The elastic element is mounted on the upper surface of the one side of the pressing button. The circuit board is mounted to and corresponding to a top surface of the elastic element. The circuit board is disposed above the pressing button. The circuit board is equipped with a first switch and a second switch. The first switch is mounted to a top surface of one side of the circuit board. The second switch is mounted to a bottom surface of the circuit board. The at least one extending foot is corresponding to the first switch to make the first switch pushable. When the operation rod of the pressing button is located at the first position, the at least one extending foot is without driving the first switch, at the moment, a power function is turned off, when the operation rod of the pressing button is pushed to move to be located at the second position, the pressing button drives the elastic element to move until the operation rod is located at the second position, the at least one extending foot drives the first switch to move until the operation rod is located at the second position, at the moment, the power function is turned on, when the power function is turned on, the extending arm is corresponding to the second switch.

Another object of the present invention is to provide a switch module applied in a wireless mouse. The switch module includes a pressing button, an elastic element and a circuit board. A lower surface of one side of the pressing button protrudes downward to form an operation rod. The operation rod is slidably exposed out of the wireless mouse. The wireless mouse has a first position and a second position opposite to each other. The operation rod is pushed to move from the first position to the second position. The one side of the pressing button has an extending arm. Two portions of an upper surface of the one side of the pressing button protrude upward to form two extending feet. The elastic element is fastened on the upper surface of the one side of the pressing button. The elastic element is fastened to a bottom surface of the circuit board. The circuit board is disposed above the pressing button. The circuit board is equipped with a first switch and a second switch. The first switch is mounted to a top surface of one side of the circuit board. The second switch is mounted to the bottom surface of the circuit board. The first switch is clamped between the two extending feet. When the operation rod is located at the first position, the two extending feet are without driving the first switch, the power function is turned off, when the operation rod is pushed to move to be located at the second position, the two extending feet drive the first switch to move until the operation rod is located at the second position, at the moment, the power function is turned on, the extending arm is corresponding to the second switch, the operation rod is pressed to make the pressing button drive the elastic element to move towards the circuit board, the extending arm is pressed on and touches the second switch to execute a bluetooth pairing function, when the operation rod is released, the elastic element exerts a rebounce force on the pressing button, the pressing button returns to an initial position.

Another object of the present invention is to provide a wireless mouse. The wireless mouse includes a lower shell, an upper shell covered to the lower shell to form an accommodating space between the upper shell and the lower shell, and a switch module accommodated in the accommodating space. The switch module includes a pressing button, an elastic element and a circuit board. A lower surface of one side of the pressing button protrudes downward to form an operation rod. The operation rod is slidably exposed out of the wireless mouse. The wireless mouse has a first position and a second position opposite to each other. The operation rod is pushed to move from the first position to the second position. The one side of the pressing button has an extending arm. Two portions of an upper surface of the one side of the pressing button protrude upward to form two extending feet. The elastic element is fastened on the upper surface of the one side of the pressing button. The elastic element is fastened to a bottom surface of the circuit board. The circuit board is disposed above the pressing button. The circuit board is equipped with a first switch and a second switch. The first switch is mounted to a top surface of one side of the circuit board. The second switch is mounted to the bottom surface of the circuit board. The first switch is clamped between the two extending feet. When the operation rod is located at the first position, the two extending feet are without driving the first switch, the power function is turned off, when the operation rod is pushed to move to be located at the second position, the two extending feet drive the first switch to move until the operation rod is located at the second position, at the moment, the power function is turned on, the extending arm is corresponding to the second switch, the operation rod is pressed to make the pressing button drive the elastic element to move towards the circuit board, the extending arm is pressed on and touches the second switch to execute a bluetooth pairing function, when the operation rod is released, the elastic element exerts a rebounce force on the pressing button, the pressing button returns to an initial position.

As described above, the operation rod is pushed from the first position to the second position, when the operation rod of the pressing button is located at the first position, the at least one extending foot is without driving the first switch, at the moment, the power function is turned off, when the operation rod of the pressing button is pushed to be located at the second position, the at least one extending foot of the pressing button drives the sliding bar of the first switch to move, at the moment, the power function is turned on, when the power function is turned on, the operation rod of the pressing button is pressed to make the pressing button drive the elastic element to move towards the circuit board, the extending arm is pressed on and touches the second switch to execute the bluetooth pairing function. As a result, an assembling space of the switch module is smaller, a cost of the switch module is lower, and the wireless mouse including the switch module has a smaller assembling space and a lower cost.

BRIEF DESCRIPTION OF THE DRAWINGS

The present invention will be apparent to those skilled in the art by reading the following description, with reference to the attached drawings, in which:

FIG. 8 is a schematic diagram showing that a power function of the wireless mouse in accordance with the first preferred embodiment of the present invention is turned on;

FIG. 9 is a schematic diagram showing that the power function of the switch module in accordance with the first preferred embodiment of the present invention is turned on;

DETAILED DESCRIPTION OF THE PREFERRED EMBODIMENT

Figure 1:
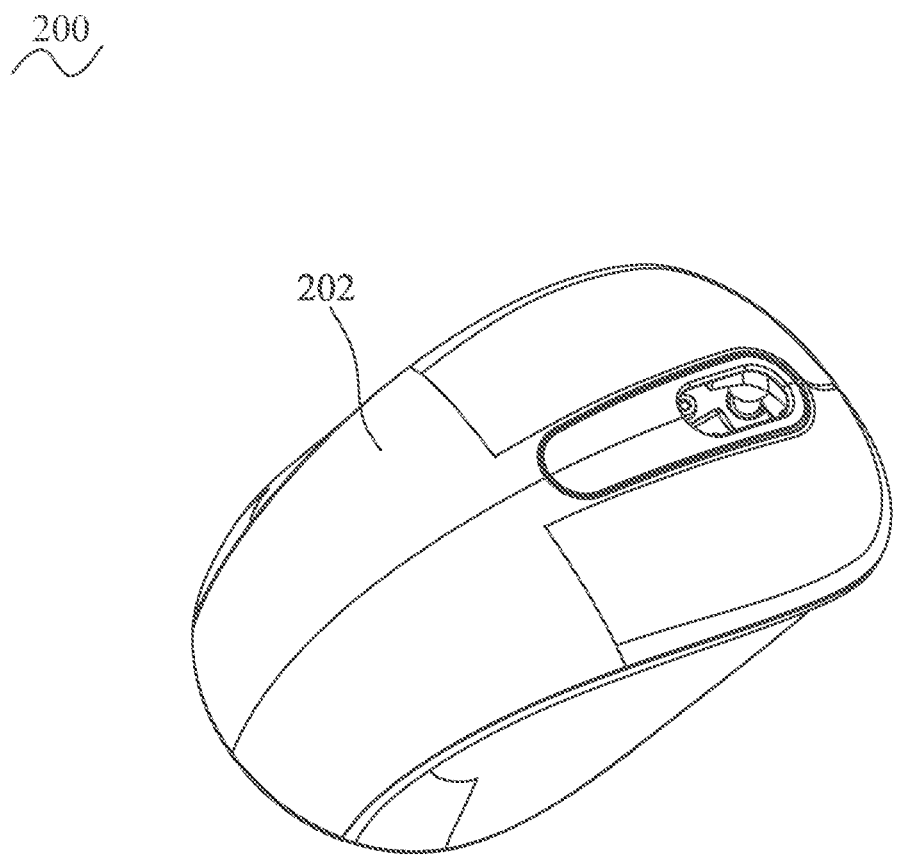
FIG. 1 is a perspective view of a wireless mouse in accordance with a first preferred embodiment of the present invention, wherein the wireless mouse includes a switch module.
Figure 2:
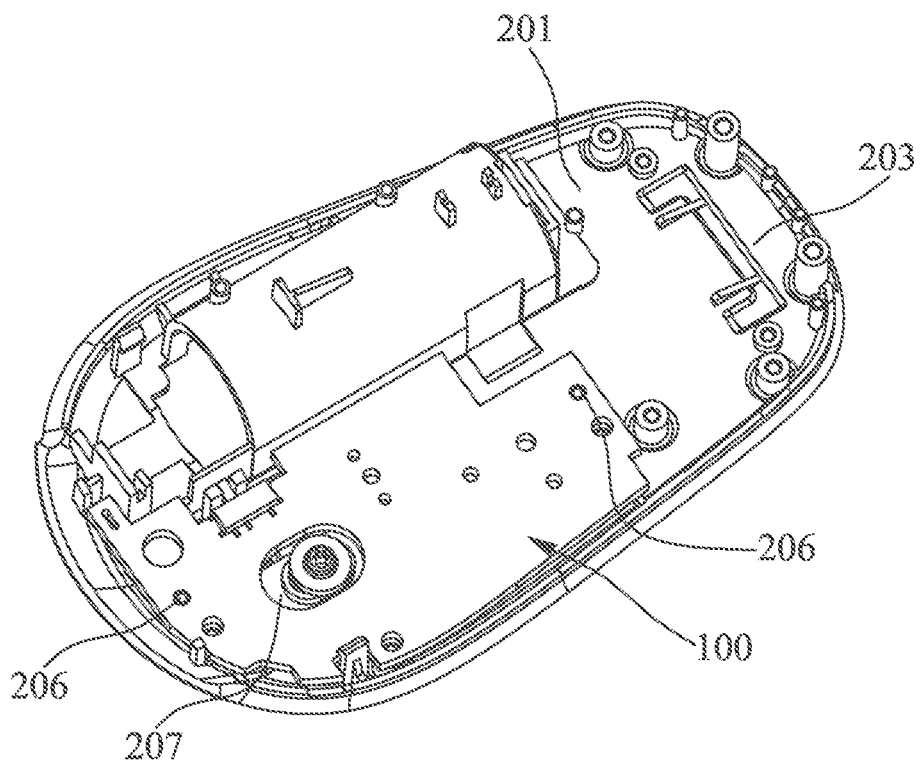
FIG. 2 is a location diagram of the switch module applied in the wireless mouse of FIG. 1.
Figure 3:
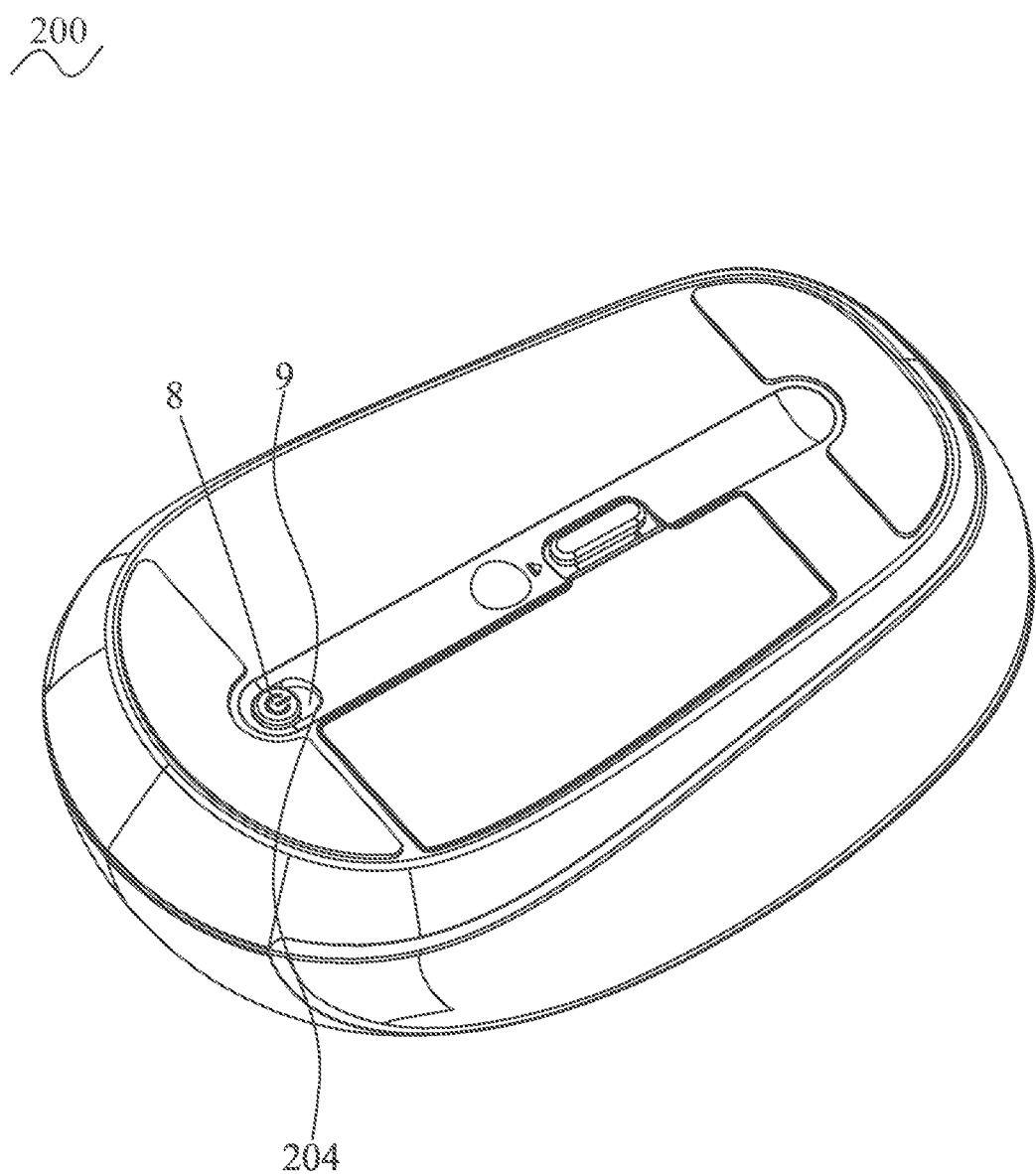
FIG. 3 is another perspective view of the wireless mouse of FIG. 1.
Figure 4:
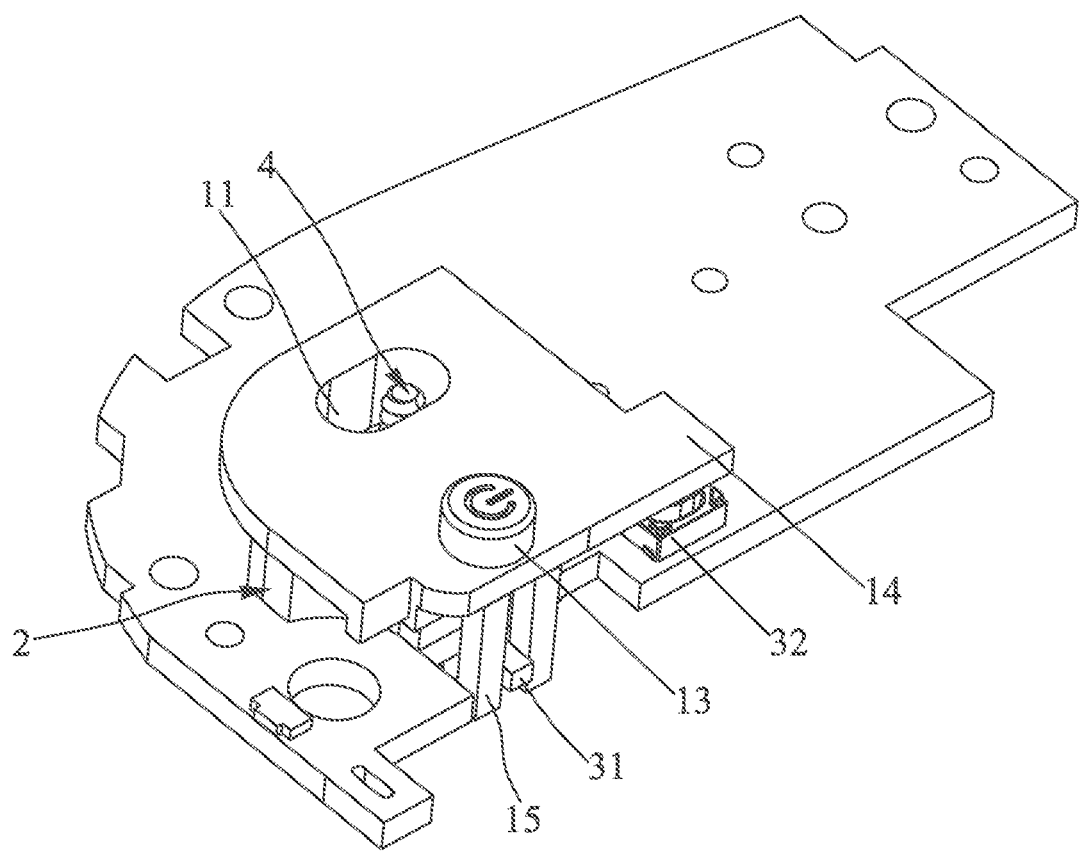
FIG. 4 is a perspective view of the switch module of the wireless mouse of FIG. 1.
Figure 5:
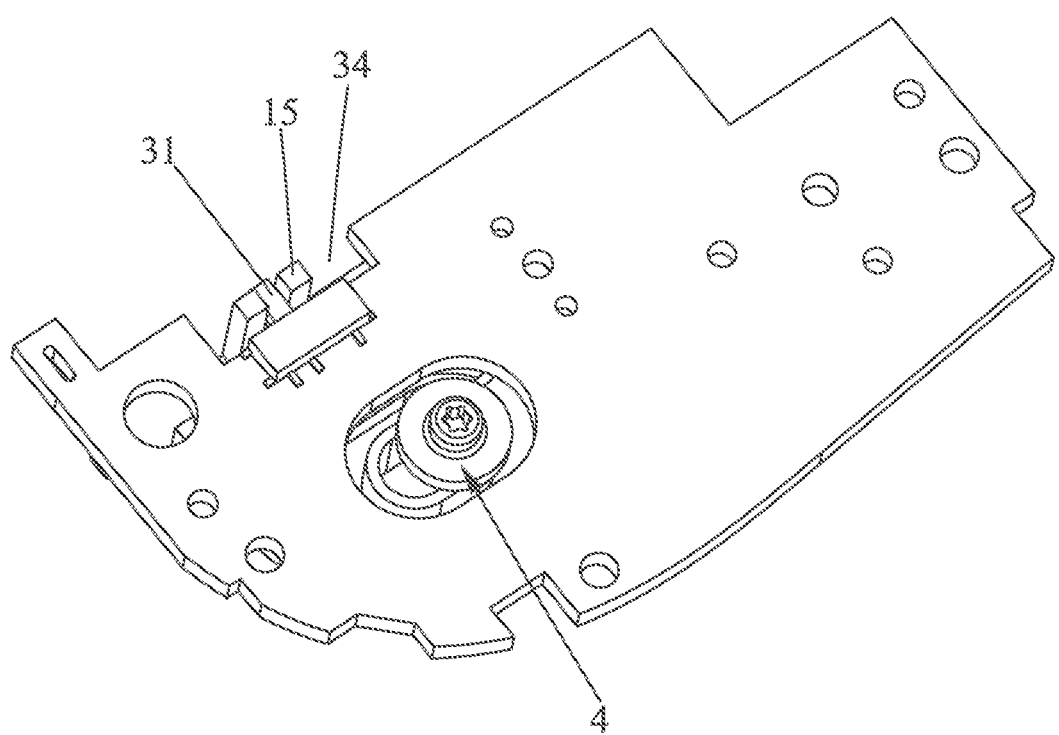
FIG. 5 is another perspective view of the switch module of the wireless mouse of FIG. 1.
Figure 6:
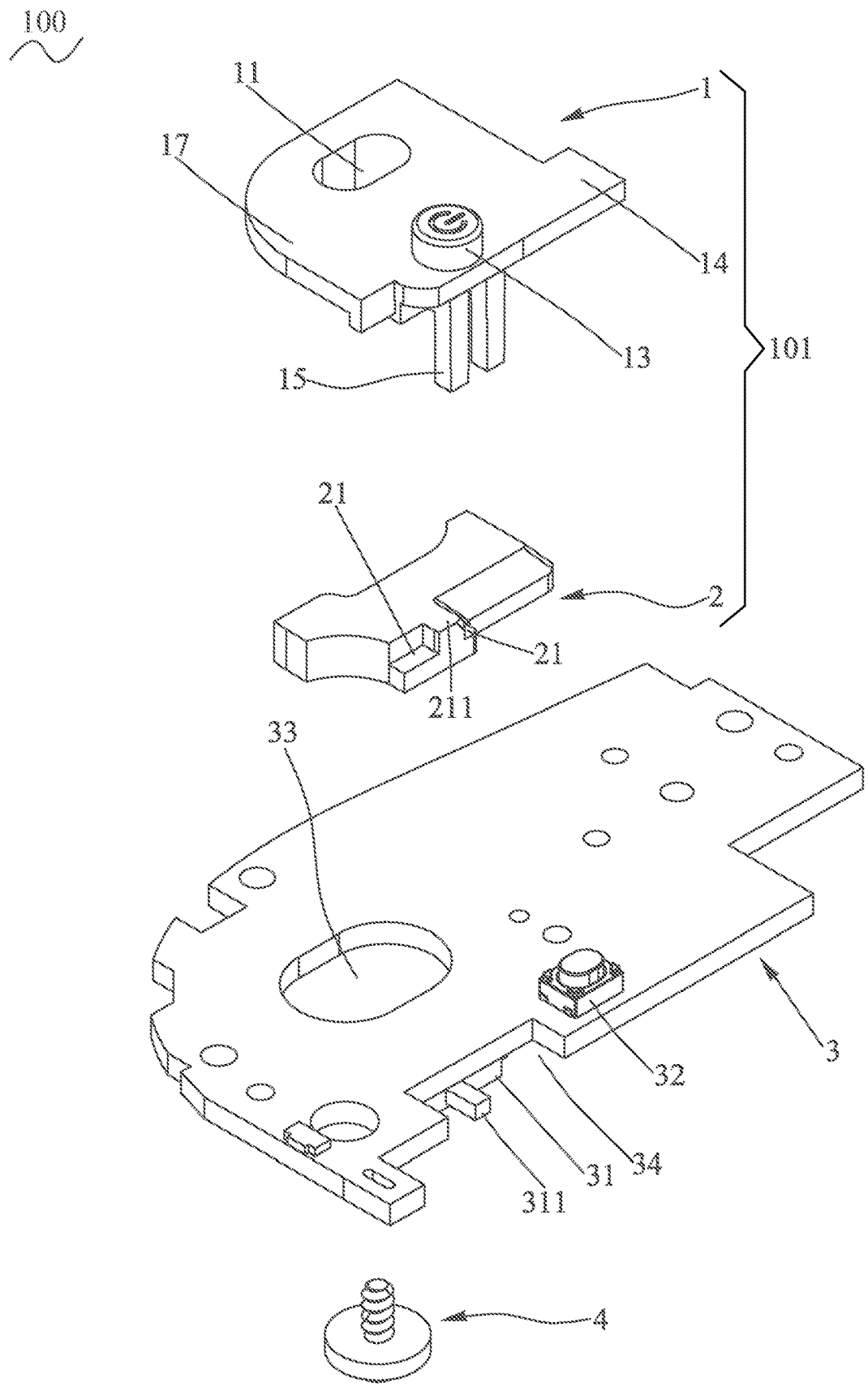
FIG. 6 is an exploded perspective view of the switch module of the wireless mouse of FIG. 1.
Figure 7:
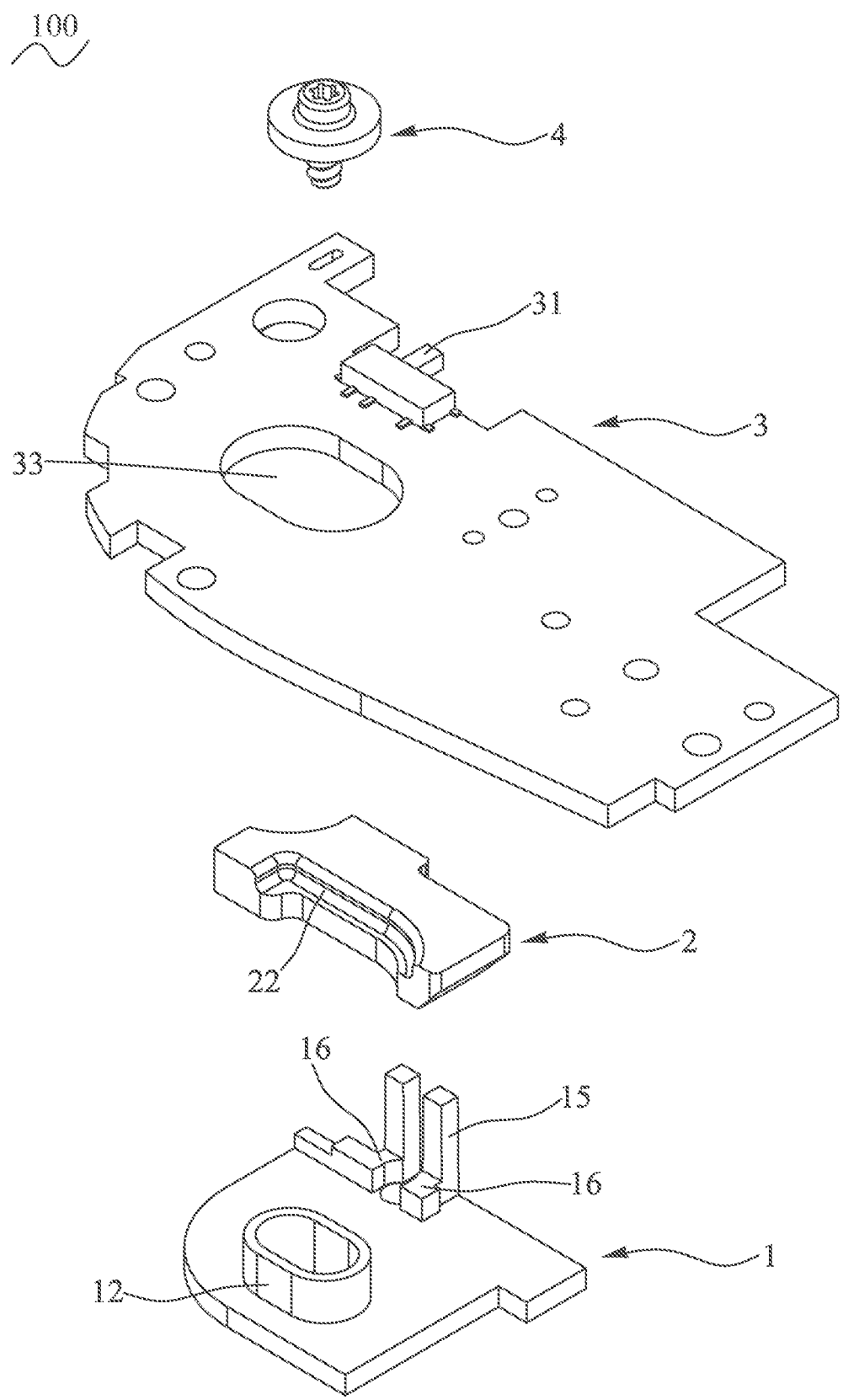
FIG. 7 is another exploded perspective view of the switch module of the wireless mouse of FIG. 1.
Figure 8:
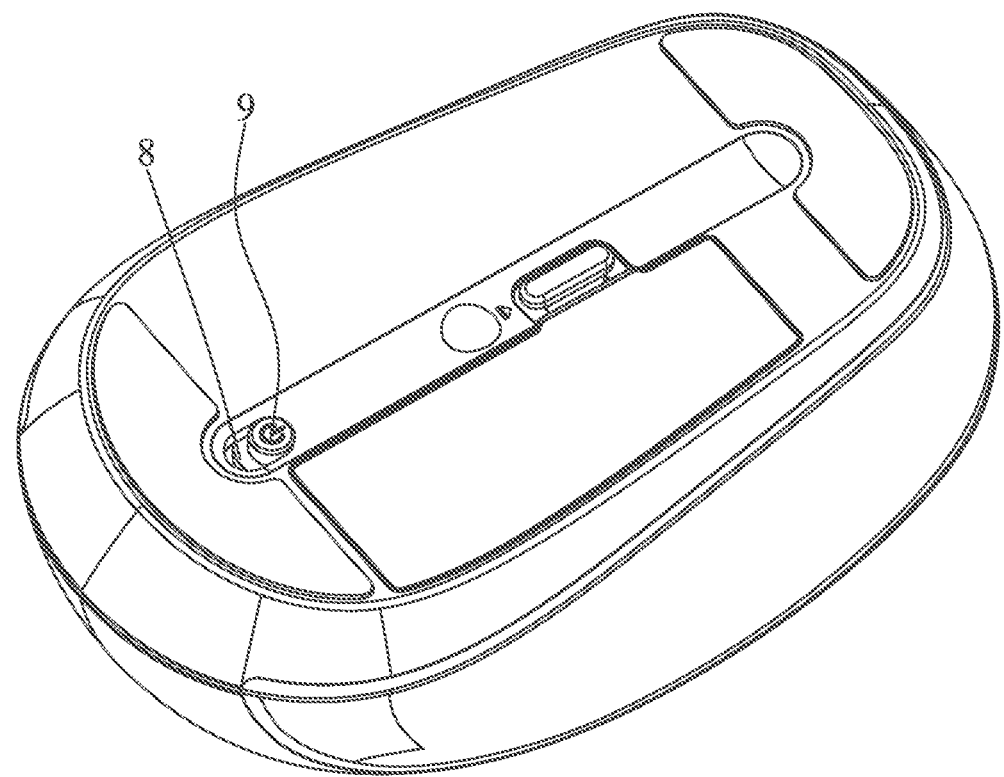
Figure 9:
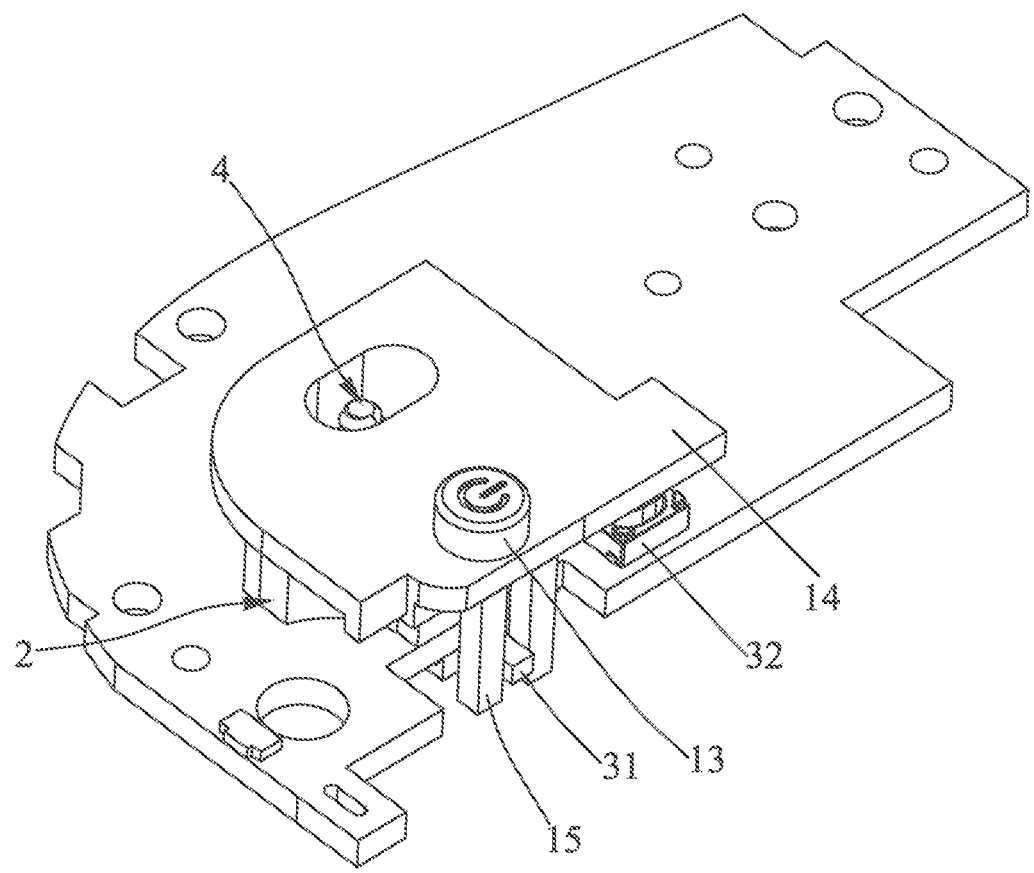
Figure 10:
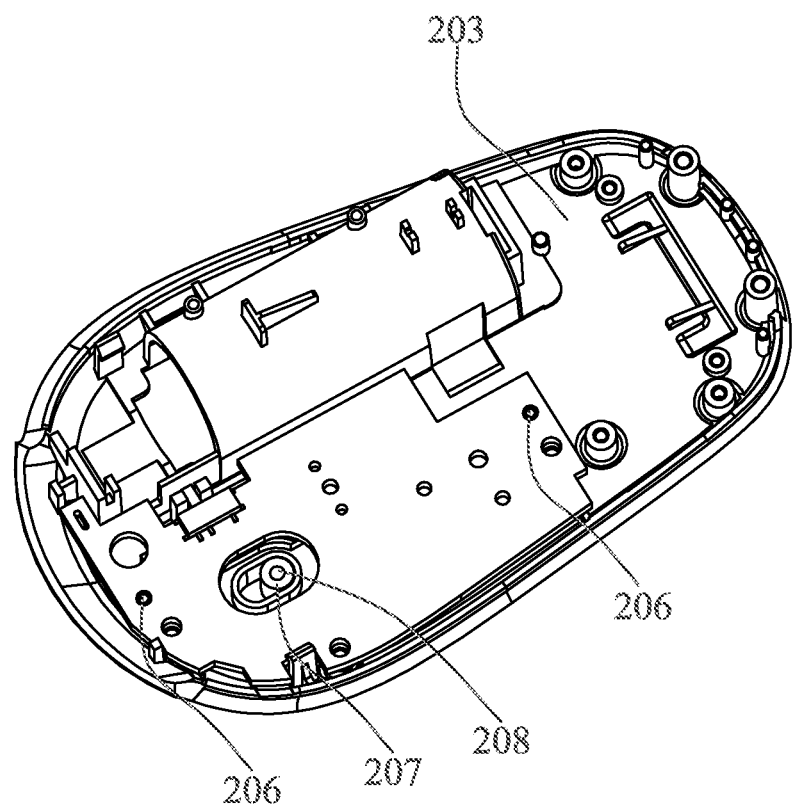
FIG. 10 is a partially perspective view of the wireless mouse in accordance with the first preferred embodiment of the present invention.

With reference to FIG. 1 to FIG. 3, a switch module 100 and a wireless mouse 200 in accordance with a first preferred embodiment of the present invention are shown. The switch module 100 is applied in the wireless mouse 200. The wireless mouse 200 includes a lower shell 201, the switch module 100 and an upper shell 202. The switch module 100 is mounted to the lower shell 201 of the wireless mouse 200. In a concrete implementation, the switch module 100 is also capable of being assembled to other types of devices (not shown).

With reference to FIG. 1 to FIG. 10, the switch module 100 and the wireless mouse 200 in accordance with the first preferred embodiment of the present invention are shown from FIG. 1 to FIG. 10. The switch module 100 is mounted between the lower shell 201 and the upper shell 202. The upper shell 202 is covered to the lower shell 201 to form an accommodating space 203 between the upper shell 202 and the lower shell 201. The switch module 100 is accommodated in the accommodating space 203. A rear of the lower shell 201 defines a sliding groove 204 penetrating through the lower shell 201 along an up-down direction. Several portions of a top surface of a lower portion of the lower shell 201 of the wireless mouse 200 protrude upward to form a plurality of propping portions 206. The top surface of the lower portion of the lower shell 201 protrudes upward to form a hollow location pillar 207. The location pillar 207 is disposed among the plurality of the propping portions 206. A middle of the hollow location pillar 207 defines an insertion hole 208 penetrating through a top of the middle of the hollow location pillar 207.

With reference to FIG. 4 to FIG. 10, the switch module 100 includes a pressing button 1, an elastic element 2, a circuit board 3 and a screw 4. The pressing button 1 is mounted on the top surface of the lower portion of the lower shell 201. The elastic element 2 is mounted on an upper surface of one side of the pressing button 1, so the pressing button 1 is mounted under the elastic element 2. The circuit board 3 is mounted to and corresponding to a top surface of the elastic element 2. The circuit board 3 is partially corresponding to the other side of the pressing button 1. The screw 4 passes through corresponding mechanisms of the circuit board 3 and the pressing button 1 for fastening the pressing button 1 to the lower shell 201 of the wireless mouse 200 to prevent the pressing button 1 being disengaged from the circuit board 3 and the lower shell 201 of the wireless mouse 200. In the first preferred embodiment, the pressing button 1 and the elastic element 2 are combined to a double-component module 101 and are formed to an integrated structure.

The pressing button 1 is fastened to the lower shell 201, and is fastened in the accommodating space 203 of the wireless mouse 200. The pressing button 1 has a through-hole 11, a limiting portion 12, an operation rod 13, an extending arm 14, an extending foot 15 and at least one reinforcing block 16. The one side of the pressing button 1 has the extending arm 14. The other side of the pressing button 1 defines the through-hole 11. The through-hole 11 penetrates through the other side of the pressing button 1 along an up-down direction. The screw 4 passes through the through-hole 11 and is inserted into the insertion hole 208 of the location pillar 207 to fasten the pressing button 1 to the lower shell 201 of the wireless mouse 200 for preventing the pressing button 1 being disengaged from the lower shell 201. A top surface of the other side of the pressing button 1 protrudes upward to form the limiting portion 12. The limiting portion 12 is of an elliptical ring shape. The limiting portion 12 surrounds the through-hole 11. The limiting portion 12 is used for limiting a position of the screw 4 to prevent the screw 4 from deviating. The operation rod 13 is slidably exposed out of the lower shell 201 of the wireless mouse 200. The operation rod 13 is slidably disposed in the sliding groove 204.

The pressing button 1 has a fastening portion 17, and an extending arm 14 extended outward from one side of the fastening portion 17. The extending arm 14 projects beyond a front surface and one side surface of the fastening portion 17. A lower surface of the one side of the pressing button 1 protrudes downward to form the operation rod 13. The operation rod 13 is protruded from a bottom surface of the extending arm 14. A top surface of the fastening portion 17 is flush with a top surface of the extending arm 14. A bottom surface of the fastening portion 17 is flush with the bottom surface of the extending arm 14. When the operation rod 13 of the pressing button 1 is pressed towards the circuit board 3, the extending arm 14 is used for pressing against and touching a corresponding structure of the circuit board 3 to execute a bluetooth pairing function.

At least one portion of the upper surface of the one side of the pressing button 1 protrudes upward to form at least one extending foot 15. The operation rod 13 is substantially in alignment with the at least one extending foot 15. When the operation rod 13 is pushed, the at least one extending foot 15 drives a corresponding part of the circuit board 3 to realize a power switch function. The at least one portion of the upper surface of the one side of the pressing button 1 protrudes upward to form the at least one reinforcing block 16. The at least one reinforcing block 16 is disposed to one side of the at least one extending foot 15, and is located between the limiting portion 12 and the at least one extending foot 15. The at least one reinforcing block 16 resists against a corresponding section of the elastic element 2 to make the pressing button 1 drive the elastic element 2 at the time of the pressing button 1 being pressed.

In the first preferred embodiment, two portions of the upper surface of the one side of the pressing button 1 protrude upward to form two extending feet 15. The operation rod 13 is substantially in alignment with the two extending feet 15. When the operation rod 13 is pushed, the two extending feet 15 drive the corresponding part of the circuit board 3 to realize the power switch function. Two portions of the upper surface of the one side of the pressing button 1 protrude upward to form two reinforcing blocks 16 spaced from each other. The two reinforcing blocks 16 are disposed to inner sides of the two extending feet 15, and are located between the limiting portion 12 and the two extending feet 15. The two reinforcing blocks 16 resist against a bottom surface of one side of the elastic element 2 to make the pressing button 1 drive the elastic element 2 at the time of the pressing button 1 being pressed. The pressing button 1 is a plastic element.

The elastic element 2 defines at least one locating portion 21 and a notch 22. At least one portion of the bottom surface of the one side of the elastic element 2 is recessed upward to form the at least one locating portion 21. The at least one locating portion 21 is used for being buckled with the at least one reinforcing block 16 to realize a location between the elastic element 2 and the pressing button 1, and a fixation between the elastic element 2 and the pressing button 1. The at least one reinforcing block 16 is located in the at least one locating portion 21. A middle of the other side of the elastic element 2 is recessed inward to form the notch 22. When the pressing button 1 is pressed towards the circuit board 3, a design of the notch 22 is used for decreasing a pressed force exerted on the pressing button 1. In the first preferred embodiment, two portions of the bottom surface of the elastic element 2 are recessed upward to form two locating portions 21 spaced from each other. An isolation block 211 is formed between the two locating portions 21. The elastic element 2 is made of rubber. The elastic element 2 has a pressed function and a rebounce function. And a surface of the elastic element 2 is smoother, so the elastic element 2 has a sliding function.

The circuit board 3 is disposed above and faces to the pressing button 1. The plurality of the propping portions 206 support against the circuit board 3 to make the circuit board 3 spaced from the pressing button 1. The circuit board 3 is equipped with a first switch 31, a second switch 32, a location hole 33 and an accommodating recess 34. One side of the circuit board 3 is recessed inward to form the accommodating recess 34. The first switch 31 is mounted above the accommodating recess 34. The first switch 31 is mounted to a top surface of the one side of the circuit board 3 and partially projects above the accommodating recess 34. The second switch 32 is mounted to the bottom surface of the circuit board 3 and is located adjacent to one end of the accommodating recess 34. One side of the first switch 31 has a sliding bar 311. The sliding bar 311 is located above the accommodating recess 34. The pressing button 1 is mounted under and spaced from the circuit board 3. The pressing button 1 is disposed under the accommodating recess 34 of the circuit board 3. The at least one extending foot 15 is disposed in the accommodating recess 34. The at least one extending foot 15 of pressing button 1 slides frontward and rearward in the accommodating recess 34, and the at least one extending foot 15 of the pressing button 1 is received in the accommodating recess 34 to be pressed or rebounded to an original position under a rebounce force action of the elastic element 2.

In the first preferred embodiment, the first switch 31 is a power switch. The second switch 32 is a pairing switch. The screw 4 passes through the location hole 33, a middle of the limiting portion 12 and the through-hole 101 to be inserted into the insertion hole 208 of the hollow location pillar 207 to fasten the switch module 100. In the concrete implementation, the switch module 100 is capable of being fastened by other ways.

The at least one extending foot 15 is corresponding to the sliding bar 311 of the first switch 31 to make the sliding bar 311 of the first switch 31 pushable. The first switch 31 is disposed to one side of the at least one extending foot 15 of the pressing button 1. Preferably, the sliding bar 311 of the first switch 31 is clamped between the two extending feet 15. When the operation rod 13 is pushed frontward and rearward in the sliding groove 204, the pressing button 1 drives the elastic element 2 to move frontward and rearward, the at least one extending foot 15 moves frontward and rearward and drives the sliding bar 311 of the first switch 31 to move frontward and rearward to realize a power switch function. When the extending arm 14 is pressed towards the second switch 32 by pressing the operation rod 13, the extending arm 14 touches the second switch 32 to execute the bluetooth pairing function. The at least one extending foot 15 is received in the accommodating space 203, when the operation rod 13 is pressed towards the circuit board 3, the at least one extending foot 15 moves upward in the accommodating space 203. When the operation rod 13 is released, the at least one extending foot 15 returns back under a rebounce force of the elastic element 2 and in the accommodating space 203.

The lower shell 201 of the wireless mouse 200 has a first position 8 and a second position 9 opposite to each other. A rear end and a front end of the sliding groove 204 are defined as the first position 8 and the second position 9. The operation rod 13 is pushed to move from the first position 8 to the second position 9 of the sliding groove 204. When the operation rod 13 of the pressing button 1 is located at the first position 8, the at least one extending foot 15 is without driving the first switch 31, at the moment, a power function is turned off. When the operation rod 13 of the pressing button 1 is pushed to move frontward to be located at the second position 9, a lower portion of the screw 4 is guided in the through-hole 11, the pressing button 1 drives the elastic element 2 to move frontward until the operation rod 13 is located at the second position 9, the at least one extending foot 15 of the pressing button 1 drives the sliding bar 311 of the first switch 31 to move frontward until the operation rod 13 is located at the second position 9, at the moment, the power function is turned on, when the power function is turned on, the extending arm 14 is corresponding to the second switch 32, the operation rod 13 of the pressing button 1 is pressed to make the pressing button 1 drive the elastic element 2 to move towards the circuit board 3, the extending arm 14 is pressed on and touches the second switch 32 to execute the bluetooth pairing function.

When the operation rod 13 is pushed frontward and rearward in the sliding groove 204, the two extending feet 15 move frontward and rearward and drive the sliding bar 311 of the first switch 31 to move frontward and rearward to realize the power switch function. When the extending arm 14 is pressed towards the second switch 32, the extending arm 14 touches the second switch 32 to execute the bluetooth pairing function. When the operation rod 13 of the pressing button 1 is located at the first position 8, the two extending feet 15 are without driving the first switch 31, at the moment, the power function is turned off. When the operation rod 13 of the pressing button 1 is pushed to move frontward to be located at the second position 9, the lower portion of the screw 4 is guided in the through-hole 11, the pressing button 1 drives the elastic element 2 to move frontward until the operation rod 13 is located at the second position 9, the two extending feet 15 drives the sliding bar 311 of the first switch 31 to move frontward until the operation rod 13 is located at the second position 9, at the moment, the power function is turned on, when the power function is turned on, the extending arm 14 is corresponding to the second switch 32, the operation rod 13 of the pressing button 1 is pressed to make the pressing button 1 drive the elastic element 2 to move towards the circuit board 3, the extending arm 14 is pressed on and touches the second switch 32 to execute the bluetooth pairing function.

Figure 11:
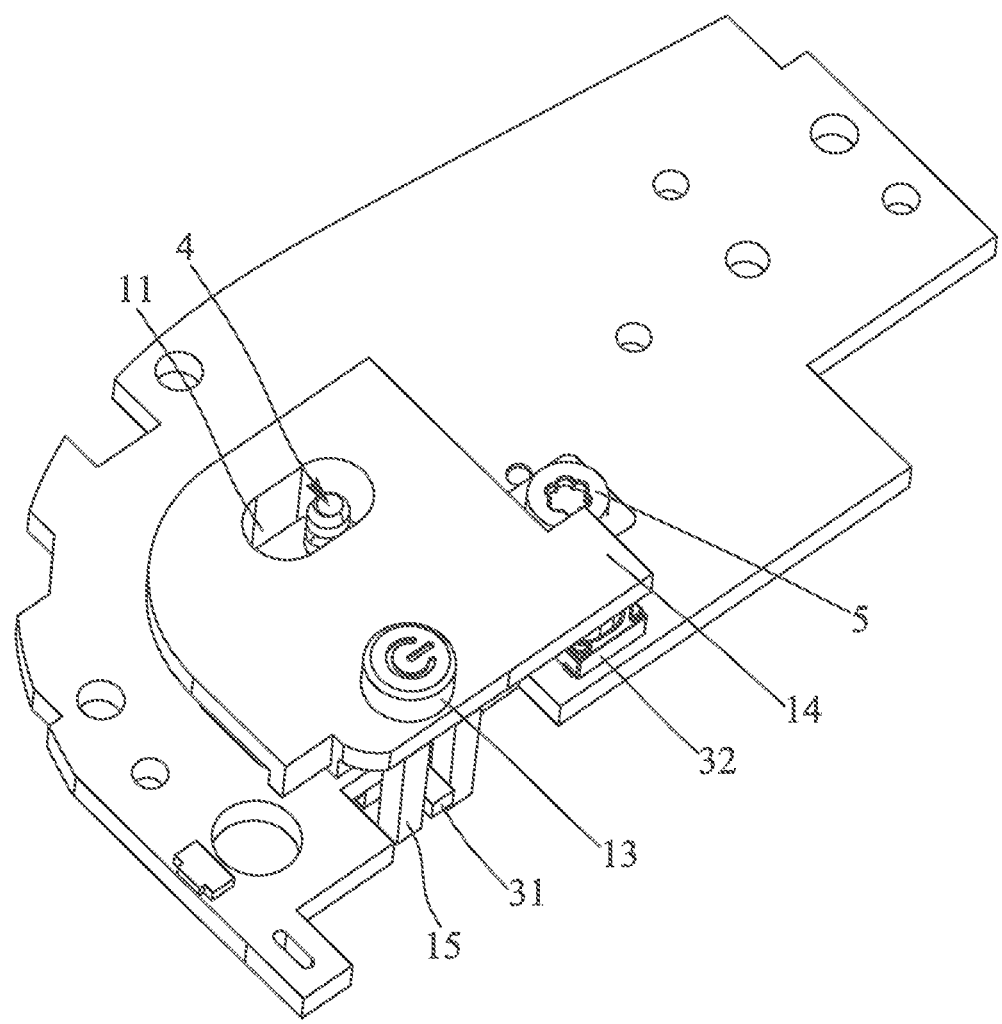
FIG. 11 is a perspective view of a switch module in accordance with a second preferred embodiment of the present invention.
Figure 12:
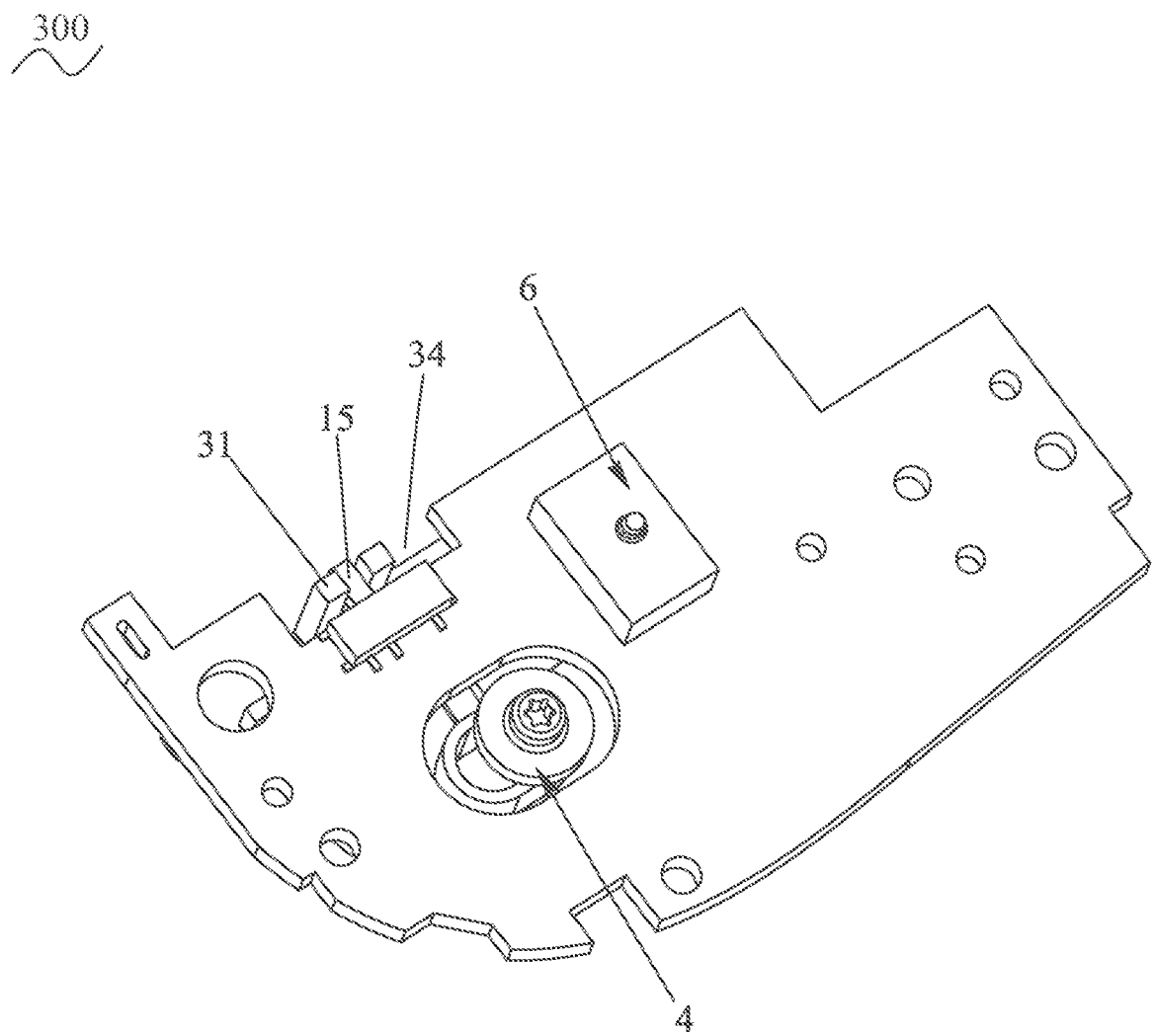
FIG. 12 is another perspective view of the switch module in accordance with the second preferred embodiment of the present invention.
Figure 13:
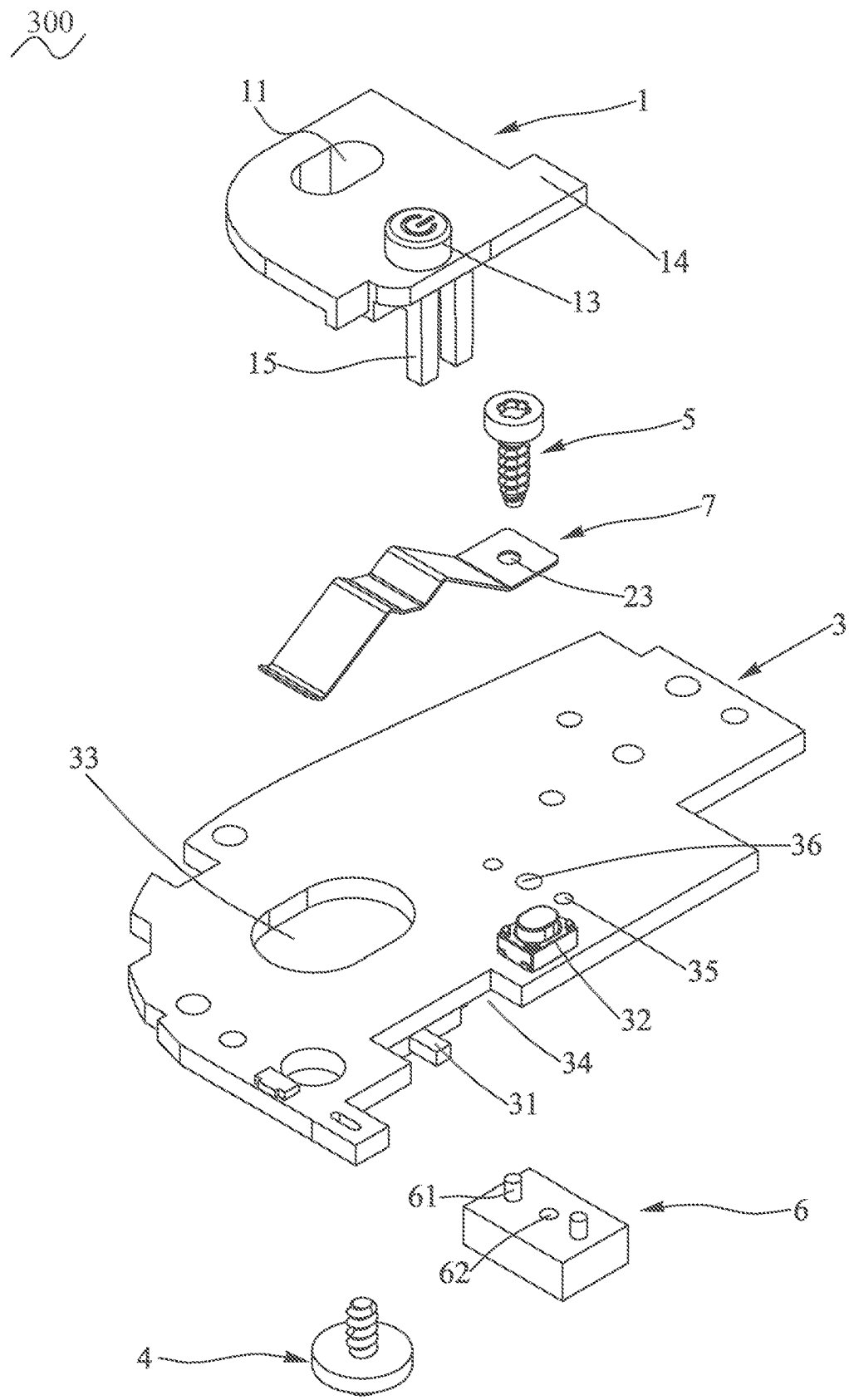
FIG. 13 is an exploded view of the switch module in accordance with the second preferred embodiment of the present invention.

With reference to FIG. 1 to FIG. 13, a switch module 300 in accordance with a second preferred embodiment of the present invention is shown from FIG. 11 to FIG. 13. Main differences between the switch module 100 in accordance with the first preferred embodiment and the switch module 300 in accordance with the second preferred embodiment are described as follows. The switch module 300 includes an elastic element 7. The elastic element 7 is of a zigzag shape. A material of the elastic element 2 is different from a material of the elastic element 7. A shape of the elastic element 2 is different from a shape of the elastic element 7. One end of the elastic element 7 defines a perforation 23. The one side of the circuit board 3 defines a plurality of fastening holes 35 and a first aperture 36.

The bottom surface of the circuit board 3 is equipped with the elastic element 7 and a fastening bolt 5. The elastic element 7 is fastened on the upper surface of the one side of the pressing button 1. The elastic element 7 is fastened to the bottom surface of the circuit board 3. The top surface of the circuit board 3 is equipped with a fastening base 6. The fastening base 6 is a substantially rectangular shape. Several portions of a bottom surface of the fastening base 6 protrude downward to form a plurality of fastening pillars 61. A middle of the fastening base 6 defines a second aperture 62. The plurality of the fastening pillars 61 are fastened in the plurality of the fastening holes 35 to realize a location between the fastening base 6 and the circuit board 3, and a fixation between the fastening base 6 and the circuit board 3. The fastening bolt 5 penetrates through the perforation 23, the first aperture 36 and the second aperture 62 from bottom to top to realize a fixation and a location among the elastic element 7, the circuit board 3 and the fastening base 6. In the second preferred embodiment, the elastic element 7 is a metallic resilience arm, and the elastic element 7 has the pressed function and the rebounce function. A surface of the elastic element 7 is smoother and has the sliding function. The pressing button 1 and the elastic element 7 are combined to the double-component module 101.

When the operation rod 13 is released, the elastic element 2 or the elastic element 7 exerts the rebounce force on the pressing button 1, the pressing button 1 returns to an initial position.

As described above, the operation rod 13 is pushed from the first position 8 to the second position 9, when the operation rod 13 of the pressing button 1 is located at the first position 8, the at least one extending foot 15 is without driving the first switch 31, at the moment, the power function is turned off, when the operation rod 13 of the pressing button 1 is pushed to be located at the second position 9, the at least one extending foot 15 of the pressing button 1 drives the sliding bar 311 of the first switch 31 to move, at the moment, the power function is turned on, when the power function is turned on, the operation rod 13 of the pressing button 1 is pressed to make the pressing button 1 drive the elastic element 2 or the elastic element 7 to move towards the circuit board 3, the extending arm 14 is pressed on and touches the second switch 32 to execute the bluetooth pairing function. As a result, an assembling space of the switch module 100 or the switch module 300 is smaller, a cost of the switch module 100 or the switch module 300 is lower, and the wireless mouse 200 including the switch module 100 or the switch module 300 has a smaller assembling space and a lower cost.

What is claimed is:

1. A switch module applied in a wireless mouse, comprising:
   a pressing button, a lower surface of one side of the pressing button protruding downward to form an operation rod, the other side of the pressing button defining a through-hole, the operation rod being slidably exposed out of the wireless mouse, the wireless mouse having a first position and a second position opposite to each other, the operation rod being pushed to move from the first position to the second position, the one side of the pressing button having an extending arm, at least one portion of an upper surface of the one side of the pressing button protruding upward to form at least one extending foot;
   a screw passing through the through-hole, a lower portion of the screw being guided in the through-hole when the operation rod is pushed to move to the second position;
   an elastic element mounted on the upper surface of the one side of the pressing button; and
   a circuit board mounted to and corresponding to a top surface of the elastic element, the circuit board being disposed above the pressing button, the circuit board being equipped with a first switch and a second switch, the first switch being mounted to a top surface of one side of the circuit board, the second switch being mounted to a bottom surface of the circuit board, the at least one extending foot being corresponding to the first switch to make the first switch pushable,
   wherein when the operation rod of the pressing button is located at the first position, the at least one extending foot is without driving the first switch, at the moment, a power function is turned off, when the operation rod of the pressing button is pushed to move to be located at the second position, the pressing button drives the elastic element to move until the operation rod is located at the second position, the at least one extending foot drives the first switch to move until the operation rod is located at the second position, at the moment, the power function is turned on, when the power function is turned on, the extending arm is corresponding to the second switch.

2. The switch module as claimed in claim 1, wherein the elastic element is made of rubber.

3. The switch module as claimed in claim 1, wherein the pressing button is a plastic element.

4. The switch module as claimed in claim 1, wherein the elastic element defines at least one locating portion and a notch, at least one portion of a bottom surface of one side of the elastic element is recessed upward to form the at least one locating portion, the at least one portion of the upper surface of the one side of the pressing button protrudes upward to form at least one reinforcing block, the at least one reinforcing block is located in the at least one locating portion.

5. The switch module as claimed in claim 4, wherein a middle of the other side of the elastic element is recessed inward to form the notch, when the pressing button is pressed towards the circuit board, the notch is used for decreasing a pressed force exerted on the pressing button.

6. The switch module as claimed in claim 1, wherein the pressing button and the elastic element are combined to a double-component module.

7. The switch module as claimed in claim 1, wherein the pressing button and the elastic element are formed to an integrated structure.

8. The switch module as claimed in claim 1, wherein the one side of the circuit board is recessed inward to form an accommodating recess, the first switch is mounted above the accommodating recess.

9. The switch module as claimed in claim 1, wherein the one side of the circuit board is recessed inward to form an accommodating recess, the at least one extending foot slides frontward and rearward in the accommodating recess, and the at least one extending foot is received in the accommodating recess to be pressed or rebounded to an original position under a rebounce force action of the elastic element.

10. The switch module as claimed in claim 1, wherein two portions of the upper surface of the one side of the pressing button protrude upward to form two extending feet, one side of the first switch has a sliding bar, the sliding bar of the first switch is clamped between the two extending feet.

11. The switch module as claimed in claim 1, wherein when the power function is turned on, the operation rod is pressed to make the pressing button drive the elastic element to move towards the circuit board, the extending arm is pressed on and touches the second switch to execute a bluetooth pairing function.

12. The switch module as claimed in claim 1, wherein a top surface of the other side of the pressing button protrudes upward to form a limiting portion, the limiting portion is of an elliptical ring shape, the limiting portion surrounds the through-hole.

13. The switch module as claimed in claim 1, wherein the elastic element is a metallic resilience arm.

14. The switch module as claimed in claim 1, wherein the elastic element is of a zigzag shape.

15. The switch module as claimed in claim 1, wherein one end of the elastic element defines a perforation, the one side of the circuit board defines a plurality of fastening holes and a first aperture, the bottom surface of the circuit board is equipped with the elastic element and a fastening bolt, a top surface of the circuit board is equipped with a fastening base, several portions of a bottom surface of the fastening base protrude downward to form a plurality of fastening pillars, a middle of the fastening base defines a second aperture, the plurality of the fastening pillars are fastened in the plurality of the fastening holes, the fastening bolt penetrates through the perforation, the first aperture and the second aperture from bottom to top.

16. A switch module applied in a wireless mouse, comprising:
   a pressing button, a lower surface of one side of the pressing button protruding downward to form an operation rod, the operation rod being slidably exposed out of the wireless mouse, the wireless mouse having a first position and a second position opposite to each other, the operation rod being pushed to move from the first position to the second position, the one side of the pressing button having an extending arm, two portions of an upper surface of the one side of the pressing button protruding upward to form two extending feet;

an elastic element fastened on the upper surface of the one side of the pressing button, one end of the elastic element defining a perforation; and a circuit board, the elastic element being fastened to a bottom surface of the circuit board, the circuit board being disposed above the pressing button, the circuit board being equipped with a first switch and a second switch, the first switch being mounted to a top surface of one side of the circuit board, the second switch being mounted to the bottom surface of the circuit board, the first switch being clamped between the two extending feet, the one side of the circuit board defining a plurality of fastening holes and a first aperture, the bottom surface of the circuit board being equipped with the elastic element and a fastening bolt, a top surface of the circuit board being equipped with a fastening base, several portions of a bottom surface of the fastening base protruding downward to form a plurality of fastening pillars, a middle of the fastening base defining a second aperture, the plurality of the fastening pillars being fastened in the plurality of the fastening holes, and the fastening bolt penetrating through the perforation, the first aperture and the second aperture from bottom to top;

wherein when the operation rod is located at the first position, the two extending feet are without driving the first switch, the power function is turned off, when the operation rod is pushed to move to be located at the second position, the two extending feet drive the first switch to move until the operation rod is located at the second position, at the moment, the power function is turned on, the extending arm is corresponding to the second switch, the operation rod is pressed to make the pressing button drive the elastic element to move towards the circuit board, the extending arm is pressed on and touches the second switch to execute a bluetooth pairing function, when the operation rod is released, the elastic element exerts a rebounce force on the pressing button, the pressing button returns to an initial position.

17. A wireless mouse, comprising:

a lower shell;

an upper shell covered to the lower shell to form an accommodating space between the upper shell and the lower shell; and a switch module accommodated in the accommodating space, the switch module including:

a pressing button, a lower surface of one side of the pressing button protruding downward to form an operation rod, the other side of the pressing button defining a through-hole, the operation rod being slidably exposed out of the wireless mouse, the wireless mouse having a first position and a second position opposite to each other, the operation rod being pushed to move from the first position to the second position, the one side of the pressing button having an extending arm, two portions of an upper surface of the one side of the pressing button protruding upward to form two extending feet, a screw passing through the through-hole, a lower portion of the screw being guided in the through-hole when the operation rod is pushed to move to the second position, an elastic element fastened on the upper surface of the one side of the pressing button, and a circuit board, the elastic element being fastened to a bottom surface of the circuit board, the circuit board being disposed above the pressing button, the circuit board being equipped with a first switch and a second switch, the first switch being mounted to a top surface of one side of the circuit board, the second switch being mounted to the bottom surface of the circuit board, the first switch being clamped between the two extending feet;

wherein when the operation rod is located at the first position, the two extending feet are without driving the first switch, the power function is turned off, when the operation rod is pushed to move to be located at the second position, the two extending feet drive the first switch to move until the operation rod is located at the second position, at the moment, the power function is turned on, the extending arm is corresponding to the second switch, the operation rod is pressed to make the pressing button drive the elastic element to move towards the circuit board, the extending arm is pressed on and touches the second switch to execute a bluetooth pairing function, when the operation rod is released, the elastic element exerts a rebounce force on the pressing button, the pressing button returns to an initial position.

* * * * *